Sept. 20, 1960 R. D. PARRY 2,953,320
AIRCRAFT WITH DUCTED LIFTING FAN
Filed July 18, 1955 7 Sheets-Sheet 1
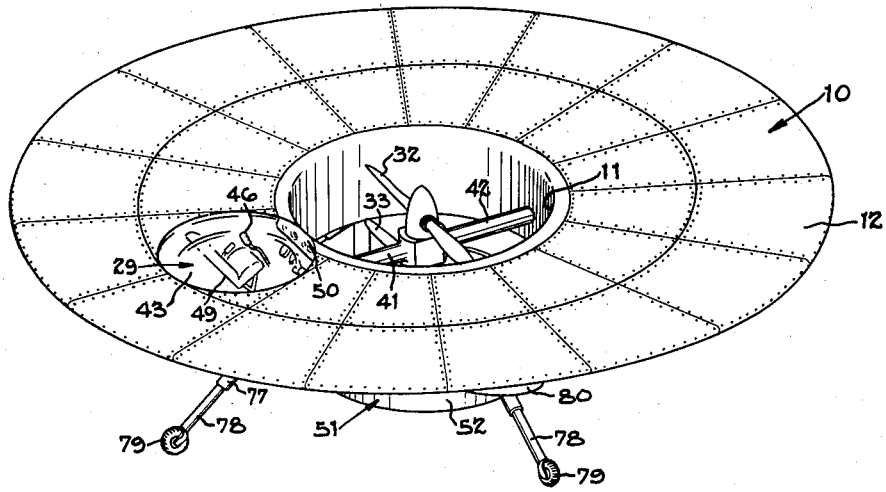
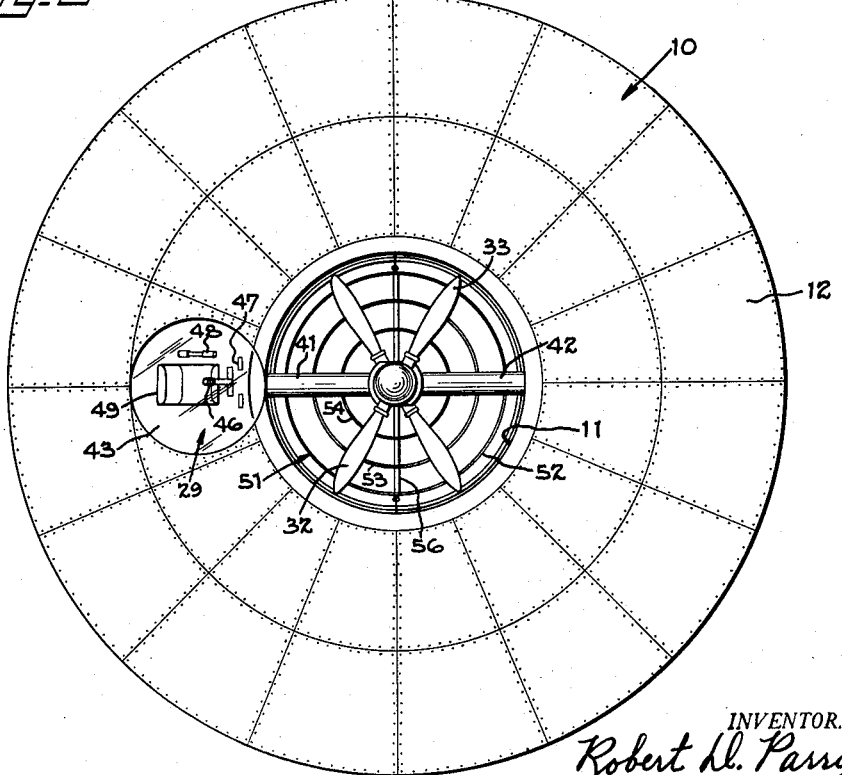
INVENTOR.
Robert D. Parry.
BY
Wood, Herron & Evans.
ATTORNEYS.

Sept. 20, 1960　　　　　R. D. PARRY　　　　　2,953,320
AIRCRAFT WITH DUCTED LIFTING FAN
Filed July 18, 1955　　　　　　　　　　7 Sheets-Sheet 2

INVENTOR.
Robert D. Parry.
BY Wood, Herron & Evans,
ATTORNEYS.

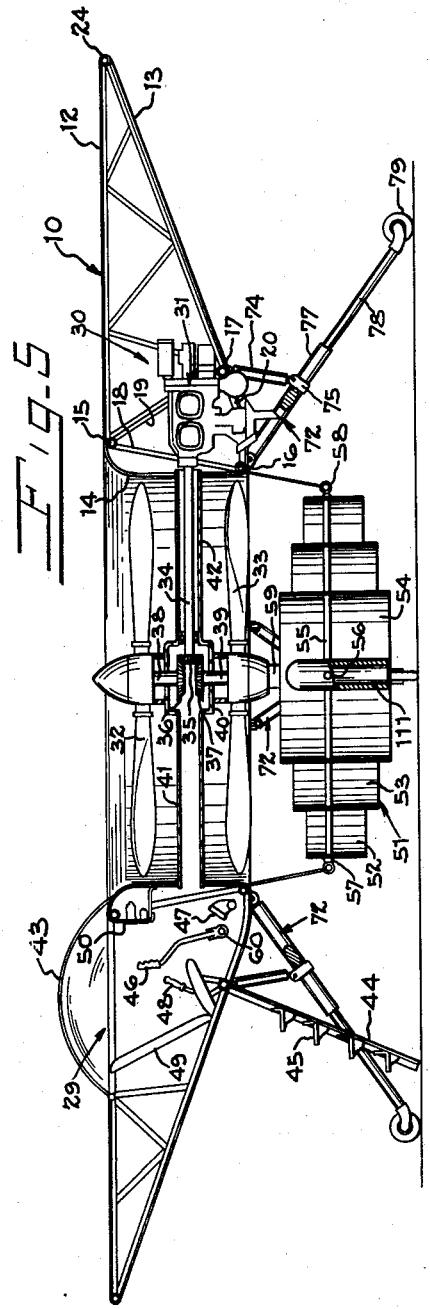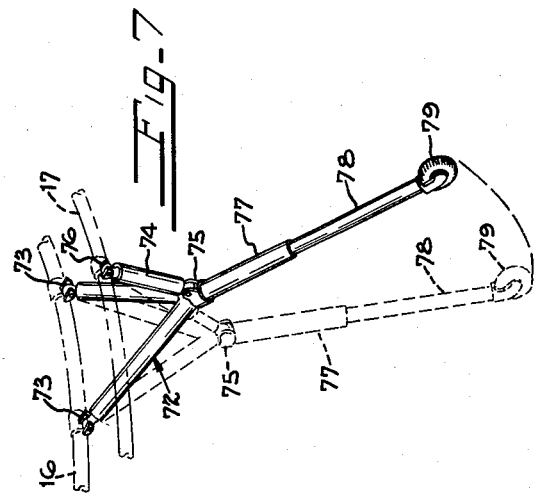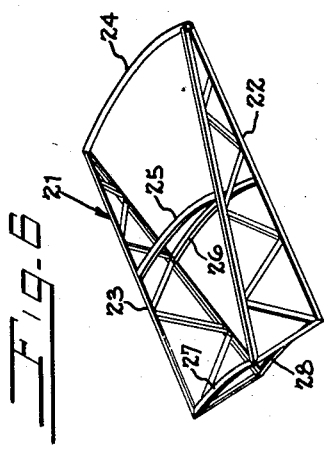

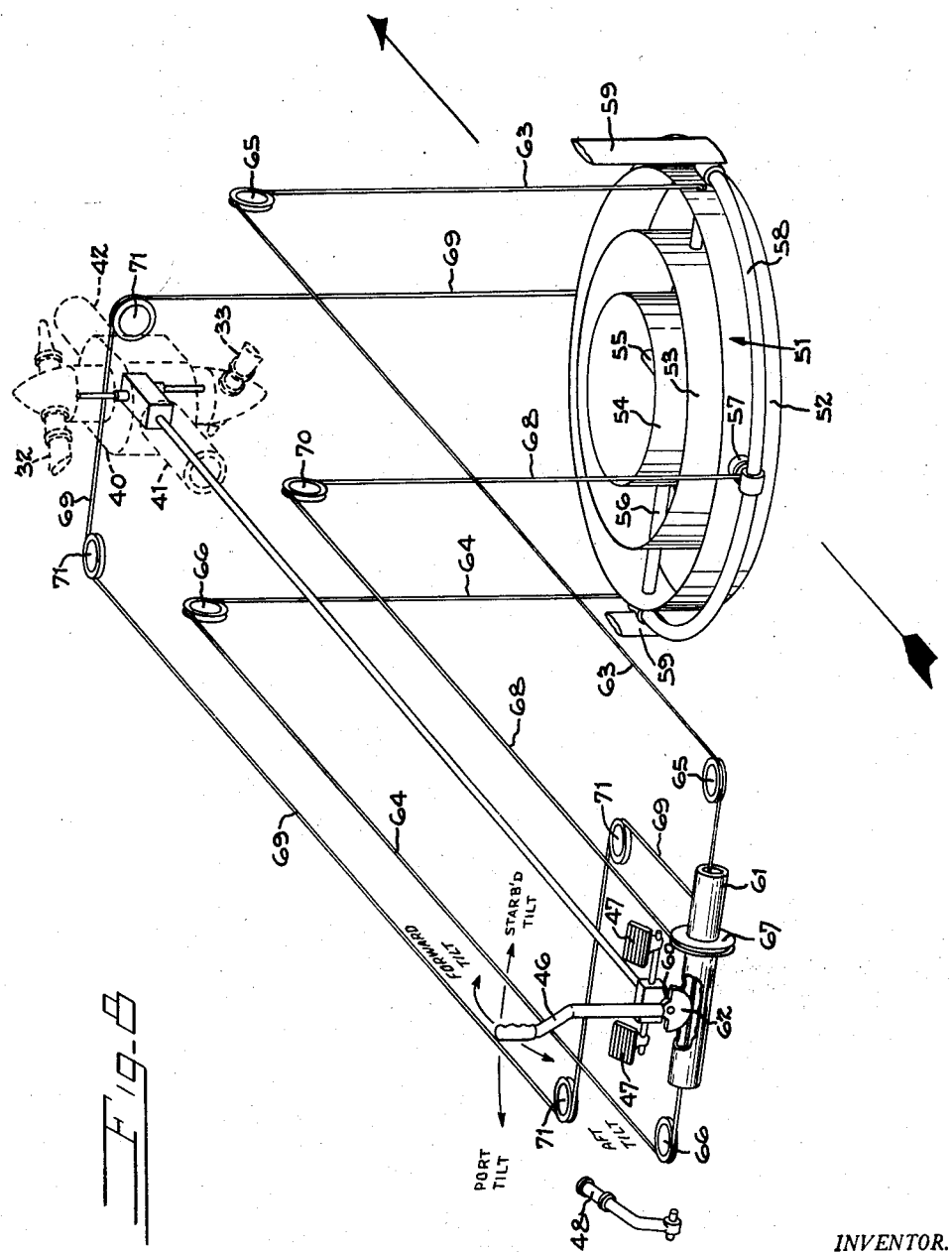

Sept. 20, 1960  R. D. PARRY  2,953,320
AIRCRAFT WITH DUCTED LIFTING FAN
Filed July 18, 1955  7 Sheets-Sheet 5
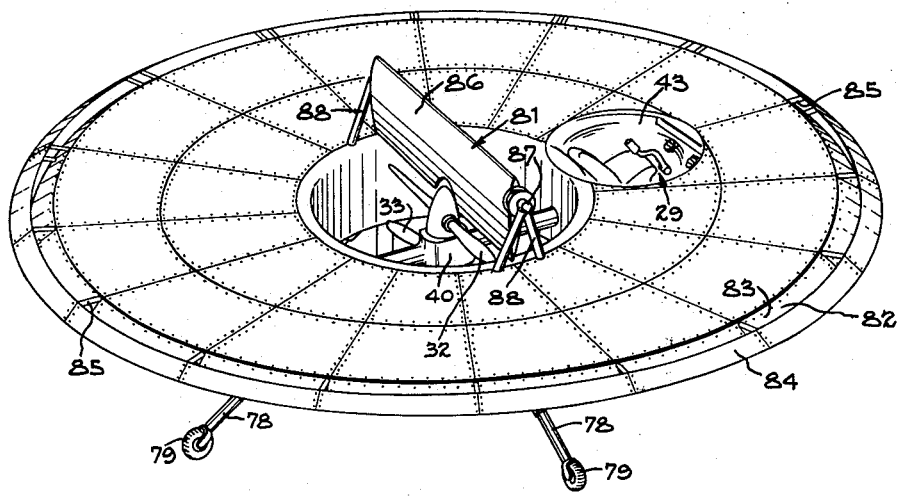
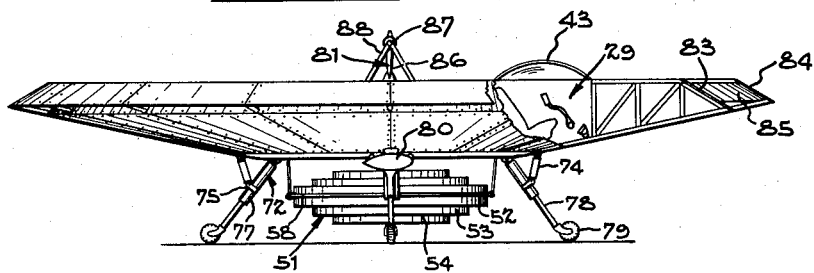
INVENTOR.
Robert D. Parry.
BY Wood, Herron & Evans,
ATTORNEYS.

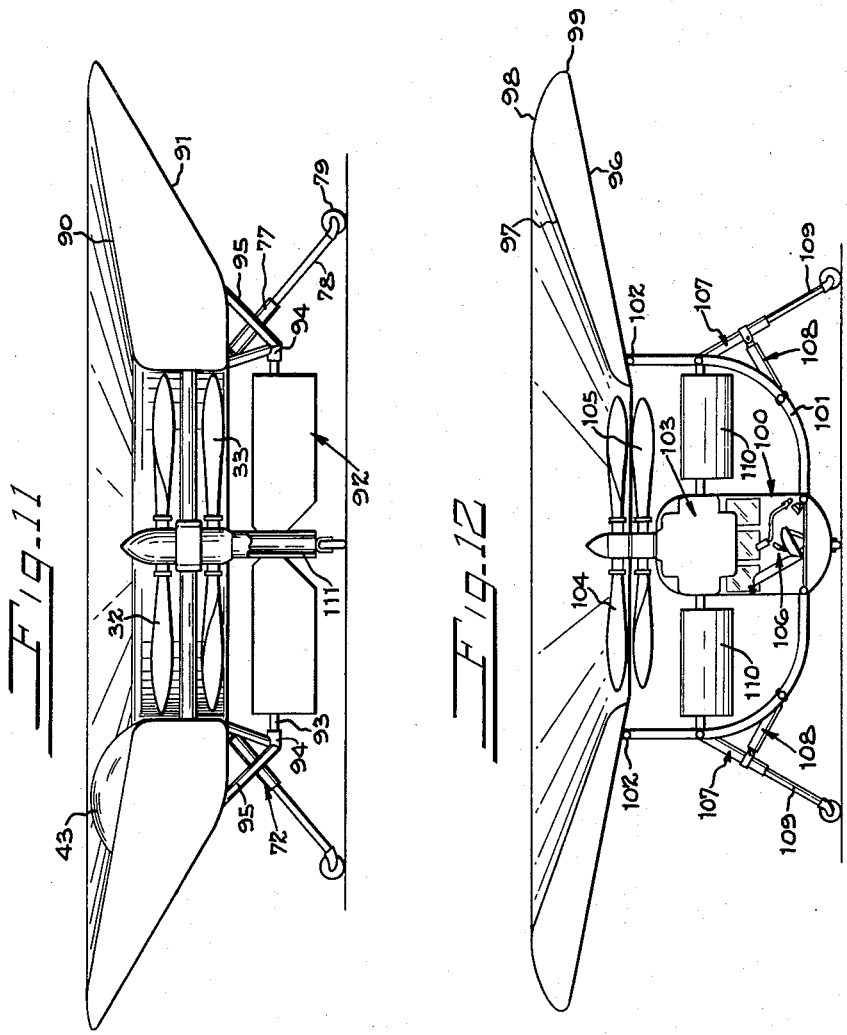

Sept. 20, 1960 R. D. PARRY 2,953,320
AIRCRAFT WITH DUCTED LIFTING FAN
Filed July 18, 1955 7 Sheets-Sheet 7
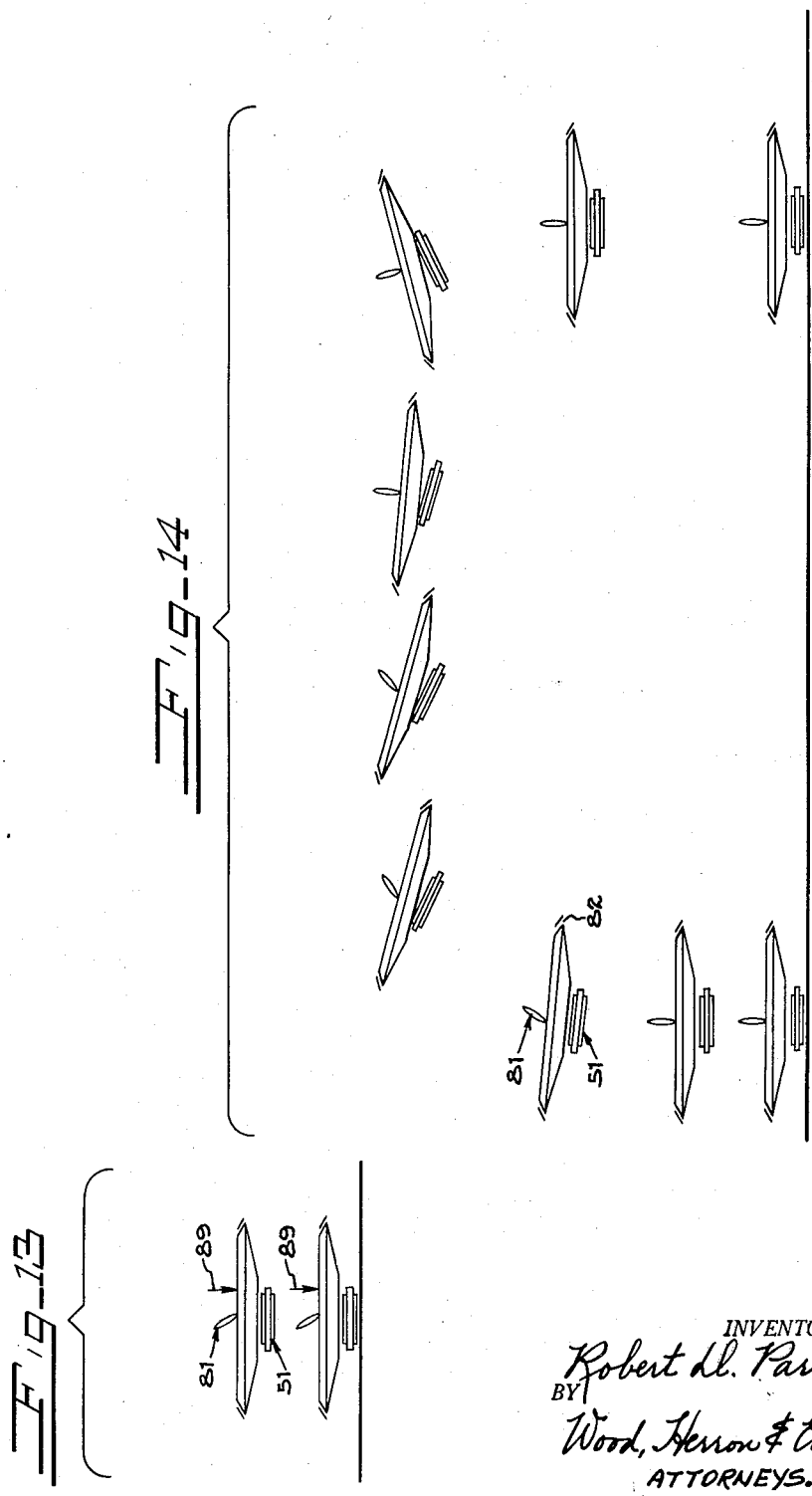
INVENTOR.
Robert D. Parry.
BY Wood, Herron & Evans.
ATTORNEYS.

United States Patent Office 2,953,320
Patented Sept. 20, 1960

2,953,320

AIRCRAFT WITH DUCTED LIFTING FAN

Robert D. Parry, Cincinnati, Ohio, assignor of twenty percent to Charles B. Bolton, ten percent to Kenyon C. Bolton, and twenty percent to Justin G. Sholes, Jr., all of Cleveland, Ohio Filed July 18, 1955, Ser. No. 522,583

9 Claims. (Cl. 244—12)

This invention relates to aircraft, and it is the primary objective of the invention to provide an aircraft to fulfill the need for a low cost, safe, easily operated aircraft which does not require conventional airport facilities to take off and to land.

The present aircraft has many of the desirable performance characteristics of a helicopter in that it can take off vertically from a position of rest upon the ground and in that it is capable of flight in any direction. But, unlike a helicopter, it does not depend upon rotating elements such as the rotor vanes of a helicopter to make a safe descent in the event of a power failure. Also unlike a helicopter, directional control is not obtained through the manipulation of rotating members such as rotor vanes. In addition, unlike a helicopter the present aircraft can be taxied, that is, moved under power, while it is upon the ground.

Essentially, the novel features of the aircraft reside in the shape of the body or airframe, which is both a fuselage and, in a sense, an airfoil; the disposition of the thrust producing device which is used to lift and sustain the aircraft in flight; and, in the controls which are provided for directing the aircraft when it is in flight.

The body or airframe is circular as seen from above. Preferably, the upper surface of the body is planar. The under surface of the body, on the other hand, is in the shape of the frustum of an inverted, shallow cone. The central area of the body is open to define a large, cylindrical throat which extends through the aircraft from top to bottom. In the preferred embodiment, thrust is produced by a pair of counter-rotating propellers which are mounted within the cylindrical throat to rotate about the vertical central axis of the aircraft and thus to produce thrust along this axis. The rotating propellers pull air through the throat, discharging it at the underside of the aircraft as a high speed stream of air. Hence, a major portion of the lift obtained is a direct result of the propellers reaction upon the air which they contact upon rotation. The remainder of the lift, and a significant part of it, is that which is obtained from air moving across the upper surface of the body of the aircraft toward the throat, being pulled into the throat by the rotating propellers.

In its simplest form, the aircraft is controlled both in flight and while being taxied on the ground by movable control surfaces which may take several forms. These control surfaces are mounted directly below the exit of the throat where they are in the path of the high speed blast of air driven downwardly by the rotating propellers. Essentially, the aircraft when in flight moves in the direction in which it is tilted. Such tilting is initiated by canting or angulating the control surfaces with respect to the direction of the stream of air driven downwardly by the propellers.

Due to the symmetrical, circular shape of the body or airframe of the aircraft, the words "pitch" and "roll," as these terms are applied to the conventional winged airplane, are synonymous as applied to attitudes of this aircraft. The word "tilting" is more apt and is used herein to describe any deviation of the central axis of the aircraft away from the vertical; and the control surfaces which are located in the high speed column of air below the aircraft control such "tilting." Turning the aircraft about its vertical central axis or "yawing," as this term is employed to describe the attitude of a conventional aircraft, may also be controlled by control surfaces in the propeller stream, but it is preferred that this control be obtained when counter-rotating propellers are employed by increasing or decreasing the torque of one or the other of the two propellers. The reaction to this difference in torque causes the plane to yaw about the axis of rotation of the propellers which coincides with the central axis of the aircraft.

Except that for safety sake the aircraft should always travel in the direction in which the pilot is facing, there is actually no need to turn or yaw the aircraft in changing the direction of flight. That is, a simple turn is possible by simply tilting the vertical axis of the aircraft in the direction in which it is desired to turn. However, because of the desirability of having a fixed fore and aft relationship for the convenience of the pilot, the latter control which turns the aircraft is provided.

The controls which are employed, including a throttle for the engine, a "stick" or wheel for tilting the aircraft and means such as pedals to turn the aircraft, may be arranged in the pilot's compartment in the same way that the controls are arranged in a conventional airplane. Thus, the transition from a conventional airplane to the present aircraft is an easily mastered one. This is a distinct advantage over the control system employed in a helicopter, wherein the controls are entirely foreign to anyone making the transition.

One of the most outstanding features of this aircraft is that it has a terminal velocity, under normal load conditions, in a free fall, such as might occur in the event of a complete power failure, which is sufficiently low that it can be absorbed safely upon impact with the ground by landing gear. The conical under surface stabilizes the aircraft so that it automatically seeks and descends in a horizontal position. In this free fall the windmilling of the propellers has an appreciable braking effect, but the main reason for the low terminal velocity is the shape of the body of the aircraft. The fall is not a completely uncontrolled one. By cross-controlling the control surfaces which are on the underside of the aircraft it may be guided or slipped to a degree such that the pilot has some control in the selection of a landing place. It is not suggested that a landing without power will be a gentle one. It is contemplated, however, that the shock of striking the earth from a free fall shall be safely absorbed in the landing gear structure without serious injury either to the occupants or to the aircraft structure.

This aircraft is an inexpensive one to manufacture in comparison with current types. The symmetrical body or airframe may be divided into a series of wedge-shaped segments substantially all of which may be of identical construction. These individual segments may be trussed following conventional airframe manufacturing techniques. Preferably the annular portion of the body surrounding the cylindrical throat is manufactured as a unit and the wedge-shaped segments may be fastened to this unit and to one another to provide the circular shape. In the preferred embodiment of the invention, one of the segments is modified to provide a pilot's compartment. Preferably, the pilot is seated in the compartment so that he faces away from the center of the aircraft toward the edge of the airframe. In this way his visibility is not hindered by the thrust producing device and the controls which are located adjacent to the throat in which the thrust producing device is mounted.

It is also preferred that the segment of the airframe diametrically opposite the pilot's compartment be modified to mount an engine to drive the counter-rotating propellers which are used in the preferred embodiment. In the larger forms of the aircraft, the annular area surrounding the throat may be modified to seat passengers or to carry other types of pay loads. It will be appreciated, therefore, that a major portion at least of the segments of which the airframe is comprised may be identical. This is in contrast to a conventional airplane in which substantially all parts are of different sizes and shapes. Obviously there is no need for the expensive fabrication of such individual components as an empennage, right and left hand wings, or for tapering fuselage sections.

In order to take off the pilot opens the throttle gradually to lift the aircraft from the ground and he then tilts it in the direction he wishes to fly. The tilting is accomplished by changing the attitude of the control surfaces which are within the high speed stream of air issuing from the bottom of the throat. To descend, the pilot simply levels off over the spot he wishes to land upon and the engine is throttled back to reduce lift, which causes the aircraft to settle. Maneuvering in flight is accomplished as in a conventional airplane. For example, to make a simple turn a conventional airplane is rolled and turned, and the pitch then changed to elevate the nose. In the present instance, however, since pitch and roll are accomplished by simply tilting the aircraft, these two changes in attitude are combined and the pilot just changes the direction of the tilt while turning. Climbing or descending, unlike in a conventional aircraft, are primarily the result of changing the amount of thrust produced, and this may be done without altering the attitude of the aircraft since it can move in these directions while in a horizontal position. It will be seen, therefore, that the combination of throttling the engine, and tilting and turning the body makes it possible to fly the aircraft in any direction, to bring it to a stop in mid air, to hover, and to climb and descend vertically.

In the drawings, several modifications including a preferred embodiment of an aircraft embodying the principles of the invention are shown. Additional objectives of the invention and advantages of the aircraft will be readily apparent to those skilled in the art from the following detailed description of these various modifications. In the drawings:

Figure 1 is a perspective view of an aircraft embodying the principles of the present invention as seen from a point above and to one side.

Figure 2 is a top plan view of the aircraft shown in Figure 1.

Figure 5 is a lateral cross sectional view through the aircraft taken on a plane which passes through the pilot's compartment and the engine compartment.

Figure 6 is a perspective view showing a part of the framework of the aircraft.

Figure 7 is a diagrammatic perspective view showing the preferred form of landing gear for the aircraft.

Figure 8 is a schematic layout showing the control system for the aircraft.

Figure 9 is a perspective view from one side and above of a modified form of the aircraft.

Figure 10 is a side elevational view of the modified form of aircraft shown in Figure 9.

Figure 11 is a diagrammatic cross sectional view showing an additional modification.

Figure 12 is a view similar to Figure 11 showing another modified form.

Figure 13 is a diagrammatic view illustrating the operation of the controls of the aircraft shown in Figure 9.

Figure 14 is a diagrammatic view showing the various attitudes of the aircraft of Figure 9 from take-off, through a flight and to a landing.

Figure 3:
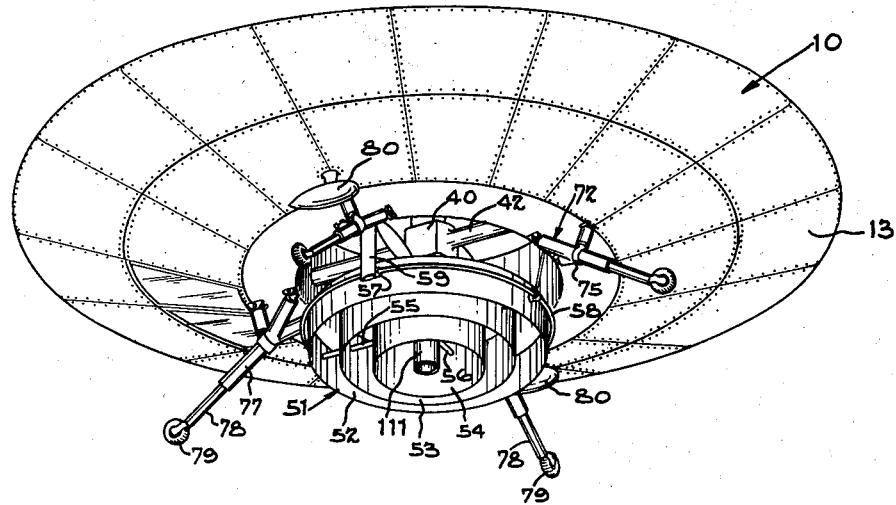
Figure 3 is a perspective view looking up toward the underside of the aircraft from a side thereof.
Figure 4:
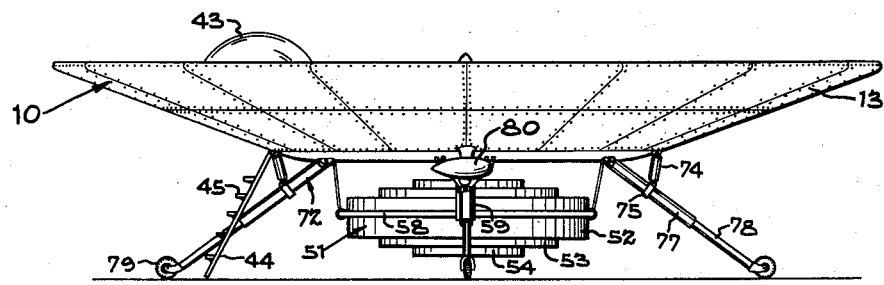
Figure 4 is a side elevational view.

In the drawings, the numeral 10 is used to designate generally the body or airframe of an aircraft embodying the principles of the present invention. The body of the aircraft is circular as viewed from above and a central opening is provided in it which defines a substantially cylindrical throat 11 extending vertically through the aircraft. The diameter of the throat may be approximately one-third of the diameter of the body, however, this relationship may be varied depending upon factors which will be explained below. As may be seen in Figures 1 through 5, it is preferred that the upper surface 12 of the body of the aircraft be flat or planar. The underside 13 on the other hand is substantially in the shape of a frustum of a cone, slanting upwardly and outwardly symmetrically from the annular area immediately surrounding the lower end of throat 11. The angle of the slant of the undersurface relative to the horizontal in this case is approximately 20°. It is also preferred that the aircraft body comprise a central, annular section, which is a structural unit, plus a plurality of wedge-shaped segments which are affixed to the central annular section and to one another surrounding the center part.

Essentially the framework for the central part of the aircraft includes a sheet metal, cylindrical shell 14 which constitutes the wall of throat 11. This shell may be made of stainless steel if desired. The upper edge of shell 14 may be flared outwardly on a radius at the entrance to the throat as shown; it is preferred, however, that the lower edge of the throat meet the underside of the aircraft at substantially a right angle. The upper rim of the shell is affixed, by means such as welding or riveting, to a circular, tubular frame member 15 which lies in a horizontal plane surrounding the entrance to the throat. The lower rim of the shell is fastened in a similar manner to a circular, tubular frame member 16 which is slightly smaller in diameter than the upper tubular frame member 15. A third tubular frame member 17 is provided which is substantially greater in diameter and which extends around the shell in spaced relationship to it and at a level above the frame member 16. These three frame members are secured to one another by sets of truss members 18, 19 and 20 each set of which is arranged in the form of a triangle, the sets of truss members being disposed at spaced points surrounding the shell. The central part of the aircraft thus comprises the shell plus the three tubular frame members and the trussing, which provides a light and structurally strong unit.

A body segment 21 is shown in skeletal form in Figure 6. A plurality of these segments is secured to the two tubular frame members 15 and 17 surrounding the unitary central part of the aircraft. These segments may be made following recognized aircraft frame manufacturing techniques. As shown in Figure 6, each segment may comprise a pair of trussed spars 22 and 23, which, in the assembled aircraft, extend radially outwardly from the central unit to an arcuately formed tubular brace 24, which brace is formed on the curvature corresponding to the circular shape of the periphery of the aircraft. Upper and lower sets of ribs 25 and 26 are provided to strengthen the mid-portion of each segment, and the inner ends of the two spars may be joined by ribs such as those indicated 27 and 28. Preferably, the latter two sets of ribs are formed on an arc which is concentric to the circular shape of the aircraft. In one embodiment of the invention all but two of the segments are identical. In this embodiment one of the segments is modified to provide a pilot's compartment indicated generally at 29, and the second segment is modified to provide an engine compartment indicated generally at 30. The segments are secured to one another following recognized airframe manufacturing techniques and the framework of the aircraft body thus provided is covered by a light weight, metal skin in which panels of sheet metal are riveted to the structural members of the frame; of, if it is desired, fabric or other materials may be used as a covering for the framework.

In the instance shown in Figure 5, a gasoline engine 31 is employed to power the aircraft. The engine may be of conventional design of the type now employed to power light aircraft. The engine 31 is mounted upon the two inner and outer circular tubular frame members 16 and 17 which are at the underside of the aircraft. To balance the aircraft the engine is located in the segment which is diametrically opposite to the pilot's compartment. In the instance shown in Figure 5, the pilot faces the engine across the throat. For convenience in describing the location of various parts of the aircraft, they are related to the vertical plane which passes through the engine and the pilot's compartment; this plane being designated the "fore and aft" plane, and a horizontal axis in this plane being designated the "fore and aft" axis, with "fore" designating that side of the aircraft toward which the pilot faces. In addition, the terms "left" and "right" are used to designate parts which are located to one side or the other of the fore and aft axis relative to the direction in which the pilot faces.

Preferably two counter-rotating propellers 32 and 33 are employed to create the thrust for lifting and sustaining the aircraft in flight. These propellers are mounted for rotation about a common vertical axis, one above the other, the axis of rotation being in alignment with the vertical central axis of the throat 11 and of the aircraft body. The propellers exert an upward thrust, and because of their location, one above the other, the pitch of the upper propeller 32 is slightly less than the pitch of the lower propeller 33 so as to equalize the torque resulting from their being rotated. The propellers are driven by a shaft 34 which extends from engine 31 toward the center of the throat 11. The inner end of shaft 34 has a bevel gear 35 keyed to it which is meshed with a bevel gear 36 at the upper side, and meshed with a bevel gear 37 at the lower side. The respective upper and lower bevel gears 36 and 37 are keyed respectively to propeller shafts 38 and 39 to drive the two propellers in opposite directions. The two propeller shafts are journalled in a housing 40 which also encloses the three bevel gears 35, 36 and 37. The housing is supported from the sides of throat 11 by means of a pair of tubes 41 and 42 which are aligned with one another diametrically of the throat with tube 42 serving as an enclosure and, through bearings, as a journal for the drive shaft 34 which connects the engine to the propeller assembly.

Although not shown in detail here, it will be appreciated that the tube 41 provides a convenient means for obtaining access to the inside of housing 40 and to the propellers for controls in the event variable pitch propellers are employed. The reason for using propellers of this type will be discussed in detail at a later point.

The primary purpose of the power plant employed in the present aircraft is to exert an upward thrust. Balanced counter-rotating propellers of the type illustrated do this without exerting a turning force upon the aircraft. It will be appreciated, therefore, that the same end may be achieved either directly or indirectly through the use of a gas turbine engine or other thrust producing device. Thus it is not intended that the invention be limited to a power plant of the specific type illustrated in the drawings.

As previously indicated, in order to balance the weight of the aircraft around the central vertical axis of the aircraft, it is preferred that the pilot's compartment or cockpit be located at a point directly opposite to the engine, as is shown in Figure 5. The cockpit may be housed within a segment 21 which is modified to omit the ribs and other cross bracing so that this area is open and as free as possible of all protuberances. In addition, it is recommended that the pilot's compartment be enclosed at the top by means of a plastic "bubble" canopy such as the one shown at 43. In order to provide access into a pilot's compartment, the underside of the aircraft includes a hinged panel or door 44 which is arranged to swing down into the position shown in Figure 5. This panel has steps 45 mounted upon it so that the pilot may climb up the panel and through the opening provided in the underside of the aircraft by lowering the panel and get into the cockpit.

It is recommended that the controls of the present aircraft conform as nearly as possible to the controls of a conventional airplane as shown so that transition to this aircraft is an easily mastered one for a pilot. Hence, the cockpit includes a conventionally mounted stick 46, a pair of "rudder" pedals 47 and a throttle 48. Inasmuch as the present aircraft has no rudder, as such, the term "rudder" as used in describing the pedals suggests the comparative change of attitude in the present aircraft which is caused by operation of the pedals—referring to the effect which manipulation of the rudder pedals of a conventional airplane has on that type of ship. The stick and "rudder" pedals are located directly in front of a pilot's seat 49, whereas the throttle is located at the left side of the seat. Movement of the stick controls the tilting of the aircraft, movement of the "rudder" pedals controls the yawing or turning movement of the aircraft, and the throttle controls the r.p.m. of the engine. It is preferred that the throttle open to increase r.p.m. by swinging the throttle handle upwardly, inasmuch as this arrangement appears to be the most natural movement for lifting the aircraft. Flight instruments may be mounted in a panel 50 which is directly in front of the pilot where they may be seen readily.

In general, the attitude of the aircraft when in flight is changed in two ways. The pedals 47 may be connected to devices for changing the pitch of one of the propellers relative to the other. Varying pitch, of course, changes the torque exerted by one of the propellers, which torque exerts a turning force on the aircraft tending to revolve it about the vertical central axis of rotation of the propellers. This change "yaws" or turns the aircraft. The other change in attitude is brought about by the reaction of the moving column of air below the propellers upon control surfaces or vane devices which are connected to the stick. Essentially, the connection from the control surfaces to the stick is arranged so that the aircraft tilts in the direction toward which the top of the stick is moved. More specifically, in the embodiment shown in Figures 1–5 of the drawings, the control surfaces are in the shape of a series of cylinders which are mounted concentrically around the vertical axis of the ship directly below the throat. These cylinders collectively form a "directional nozzle" which is designated generally by the numeral 51. In the instance shown, the directional nozzle comprises three thin-walled cylinders designated 52, 53 and 54 respectively. The cylinders are graduated in height with the central one 54 being the tallest one of the three. This arrangement is preferred so that the adequate clearance is provided between the outer cylinder and the underside of the aircraft when the nozzle is tilted severely. The three cylinders are attached to one another by a pair of cross rods 55 and 56 which extend through the various cylinders at right angles to one another. The cross rod 55 which extends fore and aft has its opposite ends pivotally journalled in bearings 57—57 which are mounted respectively upon diametrically opposite sides of a tubular gimbal ring 58. See Figure 8. The ring, in turn, is pivotally journalled for rotation about an axis at right angles to the axis of the two journals 57—57 at the lower end of struts 59—59 which depend from the underside of the aircraft at opposite sides of the throat 11. In this way the directional nozzle may be tilted, within the limits of the mount, in any direction around the point at which the two cross rods 55 and 56 meet, which is a point on the vertical central axis of the aircraft.

Referring now to the schematic layout of the control system shown in Figure 8, it will be noted that four cables are employed to tilt the directional nozzle and that all four of these cables are attached to the control stick 46 which is in the pilot's compartment. More specifically, the lower end of the stick is pivotally mounted upon a bracket 60 which is affixed to a control tube 61. The lower end of the stick is journalled to the bracket for rotation about an axis which extends generally fore and aft of the ship, whereas the tube is mounted for rotative movement around an axis which extends transversely of the aircraft. The underside of the stick below the axis upon which it is mounted constitutes an arcuate quadrant 62. Attached to the lower end of the quadrant are two cables designated 63 and 64 which extend from opposite sides of the quadrant through the longitudinal axis of the control tube 61. Cable 63 extends around a pair of pulleys 65—65 forwardly and then downwardly and it is attached at its lower end to the end of cross rod 56 which is at the right side of the aircraft. The other cable 64 passes around two pulleys 66—66 in a like manner and is attached at its lower end to the opposite end of cross rod 56. Thus, swinging the top of the stick to the left pulls cable 64 to elevate the left side of the directional nozzle, and the downward blast of air from the propellers impinging upon the angulated nozzle causes the aircraft to tip toward the left. Movement of the top of the stick in the opposite direction pulls cable 63 to tilt the directional nozzle in the opposite direction which has the effect of tilting the aircraft toward the right. The control tube 61 has a pulley 67 affixed to it, and this pulley also has two cables attached to it, designated 68 and 69 respectively, which extend respectively forwardly from the top and bottom sides of the pulley. The top cable 68 extends straight ahead around a single pulley 70 and then down to the gimbal ring where it is attached to the ring adjacent to the rear bearing 57 in the conventional manner. The cable 69, on the other hand, passes around four pulleys, each of which is indicated by the numeral 71, extending to the left of the central opening in the aircraft, and then downwardly to a point of attachment on the gimbal ring which is diametrically opposite to the point of attachment of cable 68. By attaching the two cables 68 and 69 in this way, movement of the top of the stick toward the rear of the aircraft causes the control tube to rotate for tightening cable 68. This elevates the rear of the directional nozzle to cause the aircraft to tilt upwardly at the front. Rocking the stick forward tightens cable 69 which raises the front part of the directional nozzle, having the effect of tilting the forward part of the aircraft downwardly. It will be apparent that movement of the stick to both swing quadrant 62 and to rotate pulley 67 will tilt the directional nozzle about both the axes of the gimbal ring mount, thereby permitting any desired direction of tilt for the aircraft.

The two "rudder" pedals 47—47 may be connected mechanically, electrically or hydraulically by any of the known means to the variable pitch mechanisms for one or both of the two propellers for increasing or decreasing the torque of one propeller relative to the other in order to turn the aircraft. In the instance shown in Figure 8, the two pedals are shown diagrammatically as being connected hydraulically to variable pitch mechanism at the upper one only of the two propellers so that its pitch may be varied with respect to the pitch of the lower propeller. In this case the pitch of the lower propeller is fixed. It will be obvious that various combinations of controls are possible for the two propellers including a differential type of gearing so that one propeller shaft may be slowed down by a braking device or other means relative to the other in order to cause a change in torque for turning purposes.

The throttle lever 48 may be connected to the engine 31 by any of the known means for increasing or decreasing the amount of thrust produced by the propellers. In the preferred embodiment the throttle lever is situated to the left of the pilot's seat so that he may place his right hand on the stick, or wheel if one is used, while holding the throttle with his left hand. It is preferred that the throttle lever be a substantially long one and connected to the engine so that the lever has a long arc of swing over the speed range of the engine. In this way the control is a sensitive one so that slight changes in r.p.m. may be made easily.

The landing gear employed consists of three or more shock absorbing, wheeled struts which are attached to the two inner and outer tubular frame members 16 and 17 at the underside of the aircraft. The landing gear provided has a substantial amount of movement and it is arranged so that its resistance to upward movement progressively increases. Thus the gear decelerates the downward movement of the aircraft upon landing which is in contrast to the usual type of gear in which the resistance to upward movement is substantially constant over its range of movement. In the instance shown, each strut of the landing gear comprises a Y-shaped upper portion 72, the upper ends of which are pivotally connected by means such as brackets 73—73 to the tubular frame member at spaced points. Just below the points where the two arms of the Y join one another, a decelerating oleo strut 74 is pivotally attached to the leg of the Y-shaped yoke by means such as the brackets disclosed at 75. The upper end of the decelerating oleo strut is pivotally attached to tubular frame member 17 by means of a bracket 76. Thus the Y-shaped yoke is secured to the body of the aircraft at three spaced points for stability. The lower end of the leg designated 77 of the Y-shaped yoke extends downwardly and outwardly from the suspension points and mounts a tubular strut 78 which carries at its lower end a caster type of wheel 79. Inasmuch as the impact of the present aircraft with the ground under conditions where it falls freely without power may be quite severe, the parts employed in the gear should be structurally strong ones and the range of swinging movement of the gear as shown in Figure 7 should be over a substantial vertical distance. Furthermore, if desired, the two arms of the Y-shaped yoke may be constructed so as to provide shock absorption upon impact with the ground.

Caster mounted wheels are suggested because the aircraft can be taxied while upon the ground in any direction by "revving" up the engine and tilting the directional nozzle to direct the blast of air at an angle against the ground. In such movement, the aircraft is elevated slightly with respect to the ground, but the pivotally mounted landing gear remains in contact with the ground.

Although it is not shown here, it will be appreciated that a circular pontoon may be substituted for the under carriage illustrated in the drawings in the event it is desired to have the aircraft operate off water.

Gasoline for the engine may be carried in a conventional tank mounted inside of the body of the aircraft if desired. It is preferred for safety's sake, however, to provide jettisonable gas tanks of the type shown at 80, these tanks being streamlined in the direction fore and aft of the aircraft. Two such tanks may be used and the tanks located at opposite sides of the aircraft at points spaced equally from the center. In addition the system for delivering gasoline from the tanks to the engine preferably is arranged so that gasoline is drawn equally from both tanks so as to maintain a state of balance of the aircraft as the supply is used.

Operation of the aircraft shown in Figures 1 through 5 in a typical flight is as follows. With the aircraft resting upon the ground and with the controls in neutral, the pilot accelerates the engine by raising the throttle lever 48. When sufficient thrust is developed by the counter-rotating propellers the aircraft lifts, rising straight up off of the ground. The pilot then may tilt the aircraft in the direction in which he wishes to fly while at the same time turning the aircraft so that he faces in that direction. The tilting is accomplished as previously described by changing the angulation of the direction nozzle with respect to the vertical axis of the ship. The turning is a matter of changing the torque exerted by the upper one of the two propellers for yawing the aircraft in the direction desired.

If the pilot wishes to continue to climb in the direction in which the aircraft is tilting he merely increases the throttle setting. To change the direction of flight the stick and "rudder" pedals are manipulated in unison to both tilt and turn the aircraft. The aircraft can be brought to a halt while in flight by raising the leading edge. The tendency for the aircraft to at first climb (as a result of the leading edge being elevated and the aircraft still in forward motion) may be overcome by decreasing the throttle setting. Then by manipulating the throttle and the degree of tilt of the aircraft it can be brought to a halt so that it literally hangs upon the thrust produced by the propellers and the lift produced by the air moving across the upper surface of the body toward the throat. To descend, the pilot merely decreases the r.p.m. of the engine while guiding the aircraft to a point directly above the spot on the ground he wishes to land. The aircraft may be brought to a slow halt over this spot and the throttle then slowly closed to lower the aircraft until the landing gear touches the ground.

The operation and construction of the modified form of the aircraft which is shown in Figures 9 and 10 is slightly different from the one previously described. In this instance, the basic construction is identical to the one previously described in that the directional nozzle, the landing gear, the engine compartment and the general configuration of the body of the aircraft, including the throat are substantially the same, the major changes being in the provision of an additional control vane 81 and the provision of a slotted edge 82 which extends around the periphery of the "wing" or body of the aircraft. In addition, it will be noted from Figure 9 that the pilot is turned around so that he faces away from the throat of the aircraft. This same arrangement for the pilot may be used in the modification previously described and is actually preferred because it increases his visibility, since he does not have to look over the throat and the added distance of the body of the aircraft beyond the throat. More specifically, the frusto-conical underside of this modification of the aircraft is slanted with respect to the horizontal a lesser amount than the aircraft previously described. In this instance the slant is approximately 12°; whereas, in the previously described aircraft the slant is approximately 20°. The outer edge of the upper surface is slanted downwardly with respect to the planar top of the aircraft at approximately 30° as shown at 83. A narrow, frusto-conical cowling 84, which is also slanted at 30° surrounds the periphery of the aircraft in spaced relationship to it. The cowling is secured to the aircraft by a plurality of webs 85 which extend radially outwardly from the body of the aircraft and which may be continuations of the spars 22 and 23 which are at the respective sides of the segments 21. Preferably, if continuation spars are used to form the webs the opposite sides are covered by sheet metal or other covering material to streamline them. The cowling itself may be made of stressed skin construction following known aircraft manufacturing techniques.

The slotted edge 82 thus provided is found to stabilize the aircraft to a great extent in that the slots damp out tendencies for the aircraft to oscillate during changes in attitude while in flight. The slots are also found to slow down considerably the terminal velocity of the aircraft in a power off free fall as will be explained at a later point in the specification. The directional nozzle may be connected to the control stick by cables as previously described. However, in this instance due to the reversed position of the pilot, the cables extend from the stick toward the rear of the ship. This difference is not illustrated inasmuch as the change will be readily apparent to anyone skilled in the art. The same is true of the connection between the "rudder" pedals and the variable pitch mechanism in the upper one of the two propellers.

The additional control vane 81 consists of a symmetrically shaped airfoil section 86 which, when in the neutral position, extends in a vertical plane diametrically across the top of the throat, transversely of the aircraft and immediately above the upper propeller. The opposite ends of the vane are mounted in journals designated generally 87 for rotation about an axis which extends longitudinally of the vane diametrically across the throat. The bearings at the two ends of the vane may be supported by streamlined struts such as those shown at 88, which extend upwardly from the body of the aircraft at opposite sides of the throat. The vane may be connected, following the techniques employed in providing adjustability to trim tabs on conventional aircraft, to a wheel, a crank, or an equivalent adjusting device which is located in the pilot's compartment.

The adjustable control vane 81 has two functions. For one thing it may be used to trim up the ship in the fore and aft direction in the event an unbalanced condition is present—which may occur frequently, if the aircraft is flown by different pilots whose weights vary considerably. An unbalanced condition of this sort is illustrated in Figure 13. In this case a small arrow designated 89 is used to represent an unbalanced downward force which is ahead of the vane 81. Obviously, if the aircraft is going to be taken off vertically, as soon as the aircraft is free of the ground the unbalanced weight is going to tend to tip the aircraft toward the displaced center of gravity. Such unbalance could be overcome by changing the angulation of the directional nozzle. In a severe unbalanced condition, however, this would limit considerably the directional control obtainable at the nozzle. It is found that the off center weight can be compensated for by angulating the vane 81 such that it slants upwardly away from the side at which the overload occurs. Under these circumstances, the stream of air being pulled downwardly by the rotating propellers strikes against the angulated vane (much in the same way that air strikes against an angulated rudder or aileron in a conventional aircraft) to exert a tilting moment on the aircraft. Thus, in Figure 13 the tilting moment is counter-clockwise which balances the downward force represented by the arrow 89. In its use as a means of trimming the aircraft the vane 81 has its greatest utility on take-off and landing when the aircraft is near to the ground. For the sake of safety the aircraft should be maintained in a horizontal position during these times.

The control vane 81 also may be used to alter the attitude of the aircraft in conjunction with the directional control nozzle while in flight. A typical flight from take-off to landing is illustrated in the series of small views comprising Figure 14. Assuming a substantially balanced condition, the aircraft is first taken off vertically with the vane streamlined to the column of air being pulled into the throat by the propellers. To change the attitude of the ship for moving off toward the right as viewed in Figure 4, the control vane may be angulated so that its top is toward the right. The downwardly moving stream of air acting upon the vane then exerts a tilting moment which tends to lower the front of the aircraft which is toward the right in these views. As soon as the aircraft starts to move off in the flight path toward the right, the directional control nozzle may be shifted to angulate the direction of the blast of air issuing from the throat. The aircraft is held in tilted condition while maintaining horizontal flight by the combination of the tilting moments exerted by the directional nozzle and by the vane. To bring the aircraft into the horizontal position for hovering over the spot upon which the landing is to be made, the control vane 81 may be turned so that it is straight up and down, which increases its drag to tilt the aircraft as shown. In this change of attitude, the directional nozzle may also be shifted as illustrated. Then, to decend from the hovering position the control vane remains in the neutral position, the directional nozzle is moved to neutral and the engine slowly decelerated to lower the aircraft slowly toward the earth.

In the modification of the aircraft which is disclosed in Figure 11 of the drawings the body is of slightly modified shape and a different type of control vane system is employed in place of the directional nozzle 51. In this case, the upper surface 90 of the aircraft body is slightly dish-shaped instead of being flat. The frusto-conical shape is retained at the underside 91, but the degree of slope is increased. The body shape shown, although not as stable insofar as oscillations are concerned as the modification of Figures 1 to 10 has the advantage that a slightly greater amount of lift is derived from air being pulled across the top of the body surface and into the throat by the rotating propellers. In this instance, directional control is obtained through the use of four rudder-like control vanes which are indicated generally at 92. These control vanes are mounted in pairs for turning movement about two horizontal axes which are disposed at right angles to one another. As shown in Figure 11 two of the vanes are mounted upon a rod 93 which is journalled at its opposite ends in brackets 94—94, the respective brackets being mounted upon the lower ends of struts 95—95 which depend from the underside of the aircraft. An additional pair of vanes is mounted in a similar manner upon a rod which extends at right angles to the rod 93 transversely of the aircraft. The four vanes are connected to the controls inside of the pilot's compartment by cables so as to have substantially the same effect upon changes in the attitude of the aircraft obtainable by angulating the directional nozzle 51. The vanes of each set may be operated simultaneously or, if desired, they may be arranged so that they may be operated independently of one another, the vanes of each set being movable in opposite directions relative to one another in order to turn the aircraft about its vertical axis. Substantially the same type of vane control system is employed in the modification of the invention which is disclosed in Figure 12. In this instance, the body of the aircraft, although circular and having a central opening or throat in it, in cross section, is more in the shape of a conventional airfoil. The underside, designated 96, retains the frusto-conical shape. The upper side 97, however, is also in the shape of a frustum of an inverted cone having an even greater slant than the conical surface of the underside. In the annular area, designated 98, adjacent to the periphery, the body curves outwardly and downwardly, meeting the undersurface at a radius 99 so that in cross section (as may be seen from Figure 12) the appearance of the body or "wing" is very much like an airfoil. This is done to increase the lift obtainable from air moving across the top of the aircraft toward the throat.

Due to the comparative thinness of the "wing" of this modification the pilot's compartment is disposed in a pod 100 which is located underneath the wing on the vertical central axis of the aircraft. The pod is attached to the "wing" by means of a series of arcuate struts 101 which are attached to the pod and which extend radially outwardly from it and up to attachment brackets such as those shown at 102—102 which are secured to the underside of the "wing." The pod in this instance also mounts an engine 103 for driving counter-rotating propellers 104—105. Like in the previously discussed modifications, the two propellers are mounted for rotation about the vertical central axis of the aircraft and they exert an upward thrust. The lower part of the pod, in which the pilot's seat and controls, indicated generally at 106, are located, may be enclosed in clear plastic so that the pilot has 360 degrees of visibility. The landing gear in this modification is attached to the struts 101 and consists of a pair of oleo struts 107—108 which are disposed at right angles to one another, and which are pivotally secured to the struts 101 at spaced points such that the lower end 109 of each component of the landing gear, which carries the caster wheel, may both telescope upwardly and swing radially in order to absorb landing shocks.

The directional control vanes in this case are designated 110—110. Actually four such vanes are provided, being located in pairs on the two major axes of the aircraft (like in the instance shown in Figure 11) below the counter-rotating propellers where they may be angulated with respect to one another for controlling the attitude of the aircraft.

All of the modifications which have been discussed have in common a frusto-conical undersurface plus the central opening or throat. The degree of slant of the undersurface of the different modifications vary, the two extremes being shown in Figure 11 (where the undersurface is on a slant approximately 30 degrees) and in Figure 10 where the slant of the underside is approximately 12 degrees. These specific degrees of slant are intended to be representative of a general range and are not set forth in a limiting way.

The shallower slant, which may be even less than 12 degrees, is preferred when used in combination with the cowling structure which is shown in Figure 10. The undersurface actually may approach or conform to a spherical surface, particularly in the instance of the modification shown in Figures 9 and 10, wherein the cowling serves to stabilize the oscillations of the aircraft when its attitude is changed in flight. Generally speaking the steeper the cone the more stable the aircraft is. However, the steeper slant makes the aircraft more sluggish in forward flight, the shallow slant being best suited for aircraft designed for speed.

Regardless of the degree of slant of the underside of the aircraft, the purpose in each case is the same—to provide stability in flight and particularly in a descent with or without power. The conical shape is found to stabilize the aircraft even in a fall from an inverted position, damping out oscillations so that the aircraft descends with its central axis vertical to land in an upright position.

Furthermore, the preferred modifications of the aircraft which are shown in Figures 1 through 10 and Figures 13 and 14 have the planar upper surface. Actually when the present aircraft is flying in any direction except vertically the planar upper surface is at a negative angle of attack relative to the oncoming air. Hence, in flight the aircraft "planes" against the oncoming air; but in the reverse fashion compared to the conventional aircraft which has a positive angle of attack. The drag of the planing action of the negative angle of attack is overcome by the upward component of the thrust. It may be said, therefore, that the present aircraft "planes against upward thrust," whereas the conventional aircraft "planes against the downward force of gravity."

As has been suggested previously, aircraft of the frusto-conical body design shown, under normal load conditions, have a surprisingly low speed terminal velocity in a power off free fall. This is particularly true of the preferred modification of Figures 9 and 10, wherein the slotted periphery of the body of the aircraft serves both as a stabilizing factor and as an airbrake. In such free fall the rotating propellers windmill which also slows the rate of descent. The directional nozzle or directing vanes may be used in free fall to guide the path of descent to an appreciable extent so that the pilot may have some choice of a landing spot, the latitude of his choice being dependent upon the altitude of the aircraft. It is not contemplated that the landing in a power off free fall would be an easy one. However, the landing gear provided is capable of absorbing a considerable amount of force over a relatively great vertical distance in comparison with conventional gear and the pilot is further cushioned by his seat so that the deceleration of the pilot upon impact with the ground is not a sudden one. Furthermore, in the event that the pilot loses complete control of the aircraft, and there is a power failure, he is protected in all of the embodiments of the invention, except that shown in Figure 12, by the wing or body section surrounding him which must be crushed before the pilot is exposed to injury. Hence, a power off descent over rough country or into trees should not be a disastrous one for the pilot under any circumstances.

As a further safety precaution, and for use in a free fall descent under overloaded conditions only, the aircraft of this invention may be fitted with a rocket tube of the type shown at 111. The rocket tube is directed downwardly on the central axis of the aircraft, being open at the bottom. The tube may contain a proximity fused fired rocket which will fire at a predetermined elevation above the ground during free fall to decelerate the aircraft to a safe rate of descent by the time the landing gear is ready to strike the ground.

It will be seen, therefore, that I have fulfilled the objectives set forth in providing an aircraft which is circular in shape, and therefore, economical to manufacture; one which has all of the desirable characteristics of a helicopter in that it is capable of vertical take-off and landing, which may be flown in any direction and which may hover in the air, thus not being dependent upon conventional airport facilities; an aircraft which is unusually stable in flight; and one which will literally safely land itself without any effort upon the part of the pilot.

Having described my invention, I claim:

1. An aircraft comprising a body which is circular as viewed from above, the central portion of said body being thicker than the rim thereof with the underside tapering outwardly and upwardly symmetrically from a centrally located annular area which is concentric to the rim of said body, the central portion of said body being open inwardly of said annular area to provide a cylindrical throat of substantial size which passes through the center of the body from top to bottom, a pair of counter-rotating propellers mounted within said cylindrical throat for rotation about an axis which is common to the vertical central axis of said aircraft, means to rotate said propellers for directing a high velocity stream of air downwardly through said throat, gimbal ring means mounting a plurality of concentrically arranged thin-walled cylinders beneath said throat, said cylinders normally arranged with their common vertical axis in alignment with the vertical axis of said body, and means to tilt said cylinders relative to the vertical central axis of the aircraft in any direction, whereby the reaction of the high velocity stream of air on the tilted cylinders causes said aircraft to tilt.

2. An aircraft comprising a circular body as viewed from above, the under surface of said body being in the shape of a frustum of an inverted, shallow cone, the central portion of said body being open to provide a substantial cylindrical throat which passes vertically through the center of said body, means to produce a high velocity stream of air which is directed downwardly through said cylindrical throat, a plurality of concentrically disposed, unitarily arranged thin-walled cylinders, gimbal ring means mounting said cylinders upon said body immediately below said throat for simultaneous tilting movement, said cylinders normally being disposed with their common axis aligned vertically with the central axis of said body, and means to tilt said thin-walled cylinders, whereby said high velocity stream of air reacts against said cylinders to cause the aircraft to tilt.

3. In an aircraft, an airfoil which is circular as viewed from above, said airfoil having a substantially large opening in the center thereof which extends through it from the top to the bottom, the undersurface of said body surrounding said central opening being in the shape of the frustum of an inverted shallow cone, and a cowling affixed to and surrounding the periphery of said circular body in spaced relationship therewith, said cowling being angulated outwardly and downwardly and defining with the adjacent outer peripheral edge of the aircraft a slotted area surrounding said body.

4. An aircraft comprising a body which is generally circular as seen from above, said body having a substantially large opening in the center thereof to define a throat which extends through the body concentric to the vertical central axis of said body, the upper surface of said body surrounding said throat being substantially planar, the undersurface thereof being frusto-conical in shape, a thrust producing device mounted within said throat and arranged to direct a stream of air downwardly through said throat for lifting and sustaining said aircraft in flight, and a cowling affixed to and extending around the periphery of said body in spaced relation therewith and defining with said body a slotted annular area to stabilize said aircraft in flight.

5. An aircraft comprising a body which is circular as viewed from above, the central portion of said body having a substantially large opening in the center thereof which extends through it from the top to the bottom to define a cylindrical throat, a thrust producing device mounted in said throat, said thrust producing device adapted to project a high velocity stream of air downwardly through said throat, at least one control surface which is mounted on the body of the aircraft and which is disposed below said throat within said stream of air, means to angulate said control surface with respect to said stream of air to cause said body to tilt with respect to the horizontal, and a cowling affixed to and surrounding the periphery of said circular body in spaced relationship therewith, said cowling being angulated downwardly and defining with the adjacent outer peripheral edge of the aircraft a slotted area surrounding said body.

6. An aircraft comprising a substantially circular body as seen from above, the undersurface of said body being in the shape of the frustum of an inverted shallow cone, the central portion of said body being open to define a cylindrical throat which passes vertically through the center of said body, a thrust producing device mounted within said throat to lift and sustain said aircraft in flight by directing a stream of air vertically downwardly through said throat, a cowling affixed to and extending around the outer periphery of said circular body in spaced relationship therewith, said cowling slanting downwardly and outwardly to serve as an air brake in the event of a power-off free fall descent of the aircraft, and a vane extending diametrically across the upper end of said throat, said vane adapted to be angulated with respect to a stream of air pulled downwardly through said throat by the thrust producing device while in power flight for changing the attitude of said aircraft, and said vane adapted to be angulated with respect to a stream of air moving upwardly through said throat to change the attitude of said aircraft in the event of a power-off, free fall.

7. An aircraft comprising a substantially circular body as seen from above, the undersurface of said body being in the shape of the frustum of an inverted shallow cone, the central portion of said body being open to define a cylindrical throat which passes vertically through the center of said body, a thrust producing device mounted within said throat to lift and sustain said aircraft in flight by projecting a stream of air vertically downwardly through said throat, a cowling affixed to and extending around the outer periphery of said circular body in spaced relationship therewith, said cowling slanting downwardly and outwardly to serve as an air brake in the event of a power off, free fall descent of said aircraft, and one or more control surfaces pivotally mounted upon said body and disposed below said throat, said control surfaces adapted to be angulated with respect to the stream of air projected downwardly through said throat by the thrust producing device while the aircraft is in power flight for changing the attitude of said aircraft, and said control surfaces adapted to be angulated with respect to a stream of air moving upwardly through said throat to change the attitude of said aircraft in the event of a power off, free fall.

8. An aircraft comprising a circular body as viewed from above, the upper surface of said body being planar, the undersurface of said body being in the shape of the frustum of a shallow inverted cone, the central portion of said body being open to define a cylindrical throat which passes vertically through the center of said body, a pair of counter-rotating propellers mounted within said throat for rotation about the vertical central axis of said body to produce an upward thrust, control surfaces, means to manipulate said surfaces to tilt said body in any direction with respect to the horizontal to cause said aircraft to move in flight in the direction of the tilt, and a cowling affixed to and surrounding the periphery of said body in spaced relationship therewith, said cowling slanting downwardly and outwardly to provide a slotted, annular area completely surrounding the outer periphery of the aircraft to stabilize the aircraft in any direction of flight.

9. In an aircraft, a body which is circular as seen from above, the upper surface of said body being substantially planar, the undersurface of said body being in the shape of the frustum of an inverted shallow cone, the central portion of said body being open to define a cylindrical throat extending vertically through said body, the annular portion of said aircraft body immediately surrounding said throat being a structural unit and consisting of a substantially cylindrical member defining said throat, upper and lower cylindrical tubular frame members attached to the respective upper and lower ends of said cylindrical member, a third circular tubular frame member surrounding said cylindrical member in spaced concentric relationship therewith, a plurality of sets of trussing members connecting the respective tubular frame members, the truss members of each set being arranged in triangular form and in a plane which extends radially outwardly from the vertical central axis of said cylinder, and a plurality of tapering segments connected to one another and to the central structural unit, said segments forming a continuous, annular body surrounding the central structural unit.

References Cited in the file of this patent

UNITED STATES PATENTS

| | | |
|---|---|---|
| 1,822,386 | Andersen | Sept. 8, 1931 |
| 2,377,835 | Weygers | June 5, 1945 |
| 2,468,787 | Sharpe | May 3, 1949 |
| 2,547,266 | Hoglin | Apr. 3, 1951 |
| 2,730,311 | Doak | Jan. 10, 1956 |
| 2,801,058 | Lent | July 30, 1957 |

FOREIGN PATENTS

| | | |
|---|---|---|
| 394,969 | France | Dec. 14, 1908 |
| 1,036,163 | France | Apr. 22, 1953 |